United States Patent Office 2,971,574
Patented Feb. 14, 1961

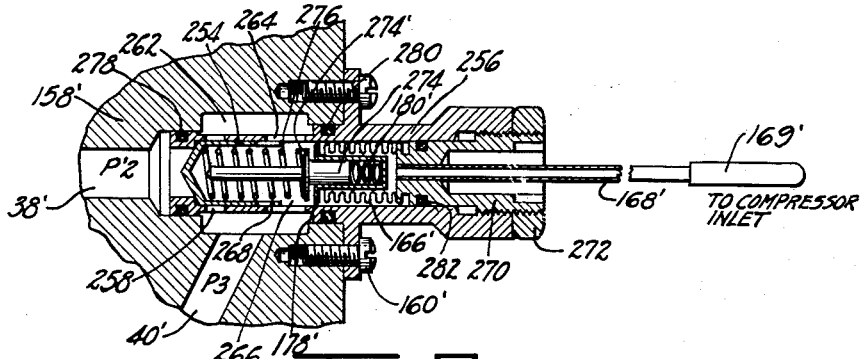
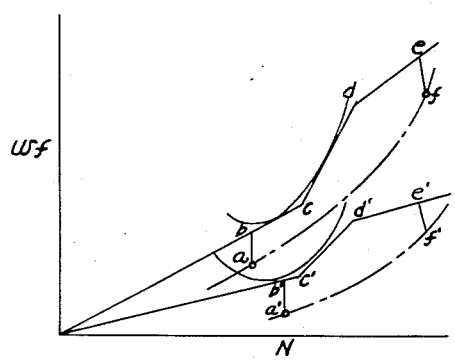
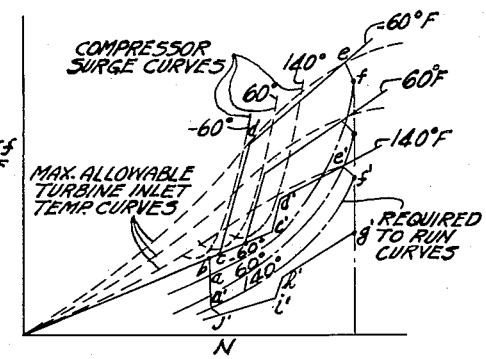
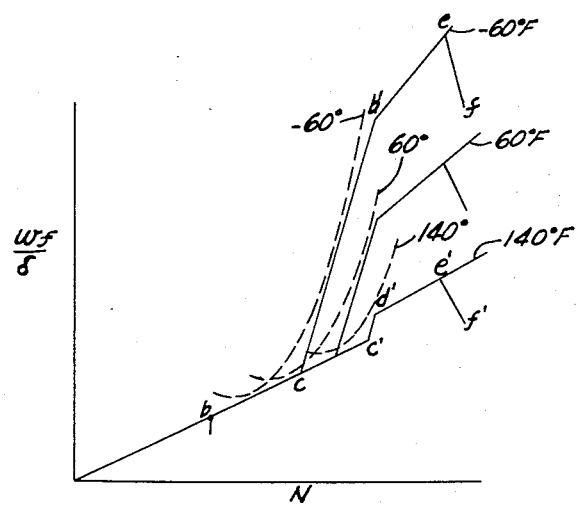

2,971,574

FUEL FEED AND POWER CONTROL DEVICE FOR GAS TURBINE ENGINES

Frank V. Kuzmitz, James M. Eastman, and Robert G. Rose, South Bend, Ind., assignors to The Bendix Corporation, a corporation of Delaware Filed Sept. 24, 1952, Ser. No. 311,206

13 Claims. (Cl. 158—36.4)

This invention relates to a fuel control system for gas turbine engines, and particularly for turbo jet and turbo prop engines of the type commonly used in aircraft. The ultimate aim in a control for such engines is to enable the pilot or operator to accelerate and decelerate to selected speeds or loads at will with maximum engine efficiency and at maximum rate without producing dangerously high temperatures or blowout in the burner system upon acceleration or burner failure or dieout upon deceleration. Ordinarily, the mass flow of air to the burners is a substantially linear function of engine speed and the rate of fuel feed may, therefore, be a function of or proportional to engine speed subject to correction for changes in entering air pressure and temperature. A fuel feed and power control device which effectively operates to maintain the rate of fuel feed within predetermined inlet turbine temperature limits as a function of engine speed is disclosed in the patents of Frank C. Mock, Nos. 2,581,275 and 2,581,276, and a copending application of the same inventor, Serial No. 716,154, now patent No. 2,689,606, filed August 29, 1946, all of which are assigned to the assignee of the present application. With such a system, the control may be set to operate within any predetermined turbine inlet temperature limit upon acceleration irrespective of how suddenly the pilot increases his power lever setting. Again, upon deceleration, the control lever may be moved back to the idle stop without fear of burner failure.

In modern high compression turbo jet and turbo prop engines, however, there is a decided tendency on the part of the compressor to surge or stall at certain engine speeds and air flows with any given conditions of compressor inlet pressure and temperature. Compressor surge or stall becomes a problem for engine designers when encountered at turbine inlet temperatures which are less than that temperature allowable as determined by the endurance of the turbine. This condition necessitates the design of a fuel control which will on the one hand avoid running the engine into the stall or surge region and on the other hand meter a quantity of fuel at all speeds and conditions of pressure and temperature at the compressor inlet such that a maximum rate of acceleration is obtained under the primary imposed conditions of compressor stall and maximum allowable turbine inlet temperature.

Further discussing the problem of compressor stall, with a dynamic air compressor running at a given speed and delivering through an orifice of fixed size, the air weight delivery tends to vary as the entering pressure and inversely as the entering temperature. If the air be raised in temperature after leaving the compressor but before reaching the discharge orifice, this will in general cause the weight delivery to decrease and the delivery pressure to rise, up to a point where the compressor stalls. If, however, the delivery conditions be such that the velocity of flow through the orifice approximates that of sound, as indicated or defined by the absolute temperature of the air approaching the orifice, this absolutely limits the weight flow through the orifice; the velocity varies with the square root of the absolute temperature, and the density inversely as the absolute temperature (and directly with the pressure), so that the net weight flow varies inversely with the square root of the absolute temperature at any given pressure.

This latter is generally the case with a gas turbine operating in the maximum power range. The velocity is sonic through the nozzles through which the gas enters the turbine blades; the weight flow varies inversely with the square root of the gas temperature entering the turbine and directly with its pressure; and all this is only remotely connected with the temperature entering the compressor.

If the weight of air which can be passed by the turbine under the condition of maximum turbine gas temperature, which as above stated is practically independent of entering air temperature, is in excess of that quantity which the compressor could deliver at the same turbine inlet pressure (note that this last quantity does vary with entering air temperature), the maximum turbine gas temperature dictates the maximum amount of fuel which can be fed. But if raising the turbine gas temperature to the maximum indicated by turbine endurance causes the compressor to stall, then lower combustion temperature, lower fuel flow, and lower thrust or accelerating torque must be tolerated. Obviously, the engine design must be such as to permit the engine to run at steady speed without compressor stall; hence the loss in performance imposed by compressor stall characteristics is usually confined to relatively slow acceleration in the mid-speed range.

It can be shown that for sea level standard pressure and temperature conditions at the compressor inlet (29.5″ Hg and 59° F.), the fuel flow required to bring the compressor discharge pressure up to the point where compressor stall begins, is a function of engine speed, i.e. $W_f = f(N)$. When compressor inlet conditions depart from standard, as upon an increase in altitude, the above equation does not hold. However, by substituting corrected values of the variables, $W_f$ and $N$, it becomes applicable to any combination of pressure and temperature values. The corrected values of the variables may be defined as their actual values multiplied by such dimensionless ratios that the resulting quantities are related in the same way as the actual values are for standard conditions at the compressor inlet.

It can be shown that if burner efficiency is assumed constant, then $$N' = \frac{N}{\sqrt{\theta}} \text{ and } W_f' = \frac{W_f}{\delta\sqrt{\theta}}$$

where $N'$ and $W_f'$ denote the corrected values of the variables for any combination of compressor inlet total pressure and temperature, $\theta$ (theta) is equal to the ratio of compressor inlet absolute total temperature to standard sea level atmospheric absolute temperature and $\delta$ (delta) is equal to the ratio of compressor inlet total pressure to standard sea level atmospheric pressure. For general pressure and temperature conditions, then we obtain $$\frac{W_f}{\delta\sqrt{\theta}} = \frac{f(N)}{\sqrt{\theta}}$$

It should be noted that this last equation reduces to the first equation above for standard compressor inlet conditions. This last equation may be considered as a basic fuel metering equation for accelerating at the compressor surge limit.

The applicants have found that if the values of $$\frac{W_f}{\delta}$$

at which compressor surge occurs are plotted against N for a particular value of compressor inlet temperature or its equivalent $\theta$, and if similar curves are plotted for various values of compressor inlet temperature, the resulting curves will all be tangent to and above a straight line through the origin. Accordingly, fuel may be metered to the engine along this straight line, which substantially defines the lower envelope of the surge curves, as a function of enigne speed and compressor inlet pressure only. The surge curve shifts downward and to the left along such a straight line through the origin with decreasing compressor inlet temperatures, and an enrichment type device, which is controlled as a function of compressor inlet temperature, may therefore be employed to sharply increase the accelerating fuel flow from this straight line along another steeper line which is also substantially tangent to the outer side of the surge curve at the existing compresor inlet temperature, until maximum allowable turbine inlet temperature is reached, after which acceleration may proceed at that turbine inlet temperature to the speed at which engine governing begins. A fuel control which will meter fuel according to the above will produce near optimum acceleration rate in an engine of the type specified for any condtions of compressor inlet pressure and temperature.

It is therefore a primary object of the present invention to provide a fuel control which will meter fuel at a rate such that engines of the types specified may be accelerated at a near optimum rate, for any given compressor inlet pressure and temperature, and at the same time will avoid compressor surge and burner blowout or overtemperature in the turbine. More specifically, the main object of this invention is to provide a fuel control which will meter fuel to the engine during acceleration in the lower speed range as a function of engine speed and compressor inlet pressure along the curve defined by the lower envelope of the compressor surge curve as it shifts with changes in compressor inlet temperature, and to provide accelerating fuel flow in the upper speed range of the engine which varies as a function of engine speed and compressor inlet pressure and temperature along a curve which results in acceleration at maximum allowable turbine inlet temperature, the transition from the first to the second curve taking place along a curve which is substantially tangent to the surge curve at any given compressor inlet pressure and temperature.

Another object of this invention is to provide a fuel control which will meter fuel during engine acceleration and prior to enrichment as a function of engine speed and compressor inlet pressure only.

Another object is to provide a fuel control which will enrich the flow of fuel to the engine during acceleration at predetermined speeds, the speed at which enrichment begins being a function of compressor inlet temperature.

Another object is to provide a relatively simple and compact fuel control which will supply an accelerating rate of fuel flow to engines of the types specified such that acceleration at near optimum rates is realized.

Another object is to provide a simple, compact unitary structure in a fuel control which enables the flow of accelerating fuel to the engine to be enriched at a predetermined rate, said enrichment being initiated at engine speeds which vary as a function of compressor inlet temperature, and which retards the flow of temprature compensated fuel to the engine below the predetermined speeds at which enrichment begins.

A further object is to provide in a fuel control for engines of the types specified a fuel enrichment and temperature compensating device adjustable to vary the speed and fuel flow at which enrichment begins for any given conditions of compressor inlet pressure and temperature, to vary the speed and fuel flow at which enrichment ends for any given conditions of compressor inlet pressure and temperature, to vary the fuel flow rate which determines turbine inlet temperature after enrichment ends for any conditions of compressor inlet pressure and temperature, and which is easily adaptable to meet widely varying requirements of engines having different characteristics.

A still further object is to provide in a fuel control for turbojet and turboprop engines which meter fuel as a function of engine speed, a temperature conpensating device in series with a pressure compensating device, said pressure compensating device being operable to vary the flow of fuel to the engine with any change in engine inlet pressure during all phases of engine operation and said temperature compensating device being operable to vary the flow of fuel to the engine with changes in engine inlet temperature only during those phase of engine operation which are beyond some predetermined engine speed.

The foregoing and other objects and advantages will become apparent in view of the following description taken in conjunction with the drawings, wherein:

Figure 3 is a sectional schematic view of a modification of the fuel enrichment and temperature compensating control valve unit shown in Figure 2;

Figures 4, 5 and 6 are curve charts illustrating the operation of the main fuel control unit shown in Figure 2 and of the fuel enrichment and temperature compensating portion of the fuel control as shown in Figures 2 and 3.

Figure 1:
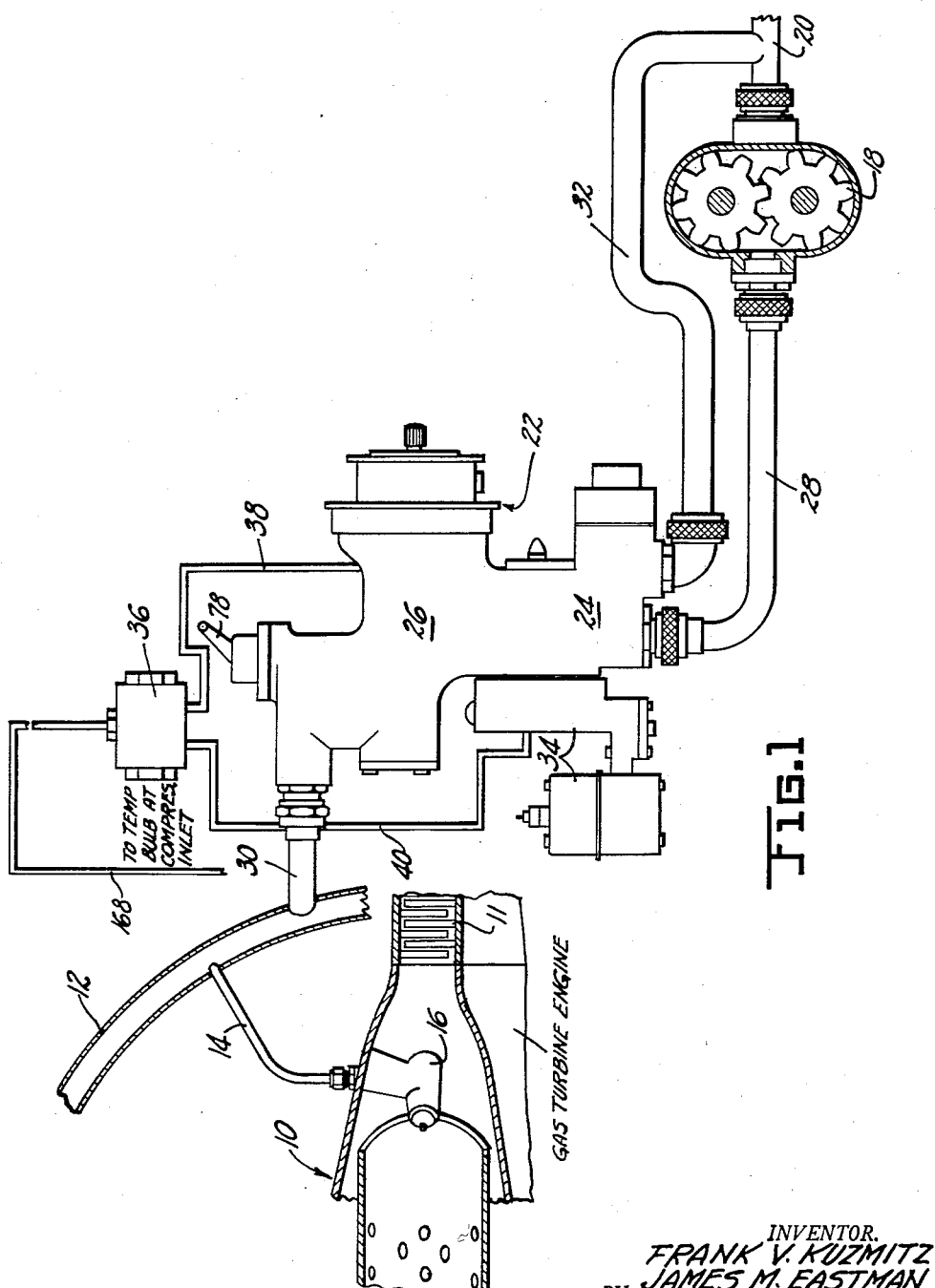
Figure 1 is a view in sectional elevation of a fuel control device for a gas turbine engine in accordance with the invention.

In Figure 1, one of the combustion chambers and associated burner of a gas turbine engine is generally indicated at 10; it is supplied with air by means of a compressor, shown in part at 11, and with fuel from a control device to be described by way of a fuel manifold 12, pipe or conduit 14 and burner nozzle or atomizer 16. The fuel is ignited upon discharge and the expanded air and products of combustion are discharged through a turbine, not shown, which drives the compressor, the remaining unexpended energy being used either for jet thrust or driving a propeller or both, depending upon the particular type of engine involved. The fuel to be burned in the combustion chamber 10 is supplied to the manifold 12 and the nozzle 16 from a suitable source of supply, not shown, from which is drawn the fuel to be burned by an engine driven pump 18 through a conduit 20, said pump supplying pressurized fuel to a fuel feed and power control device or fuel control device 22, which comprises a fuel regulator section 24 and a fuel metering or control section 26, through a conduit 28, said fuel control device supplying metered fuel through conduit 30 to the fuel manifold 12. The quantity of fuel which is in excess of that metered by the control 22 to combustion chamber 10 is by-passed through a conduit 32 back to pump inlet. A pressure compensating device for effectively varying the quantity of fuel metered to the combustion chamber as required with variations in compressor inlet pressure, is shown generally at 34, while an enrichment and temperature compensating device for effectively varying the flow of metered fuel to the combustion chamber as a function of compressor inlet temperature is shown at 36 and communicates with appropriate sections of the fuel control 22 through conduits 38 and 40.

Figure 2:
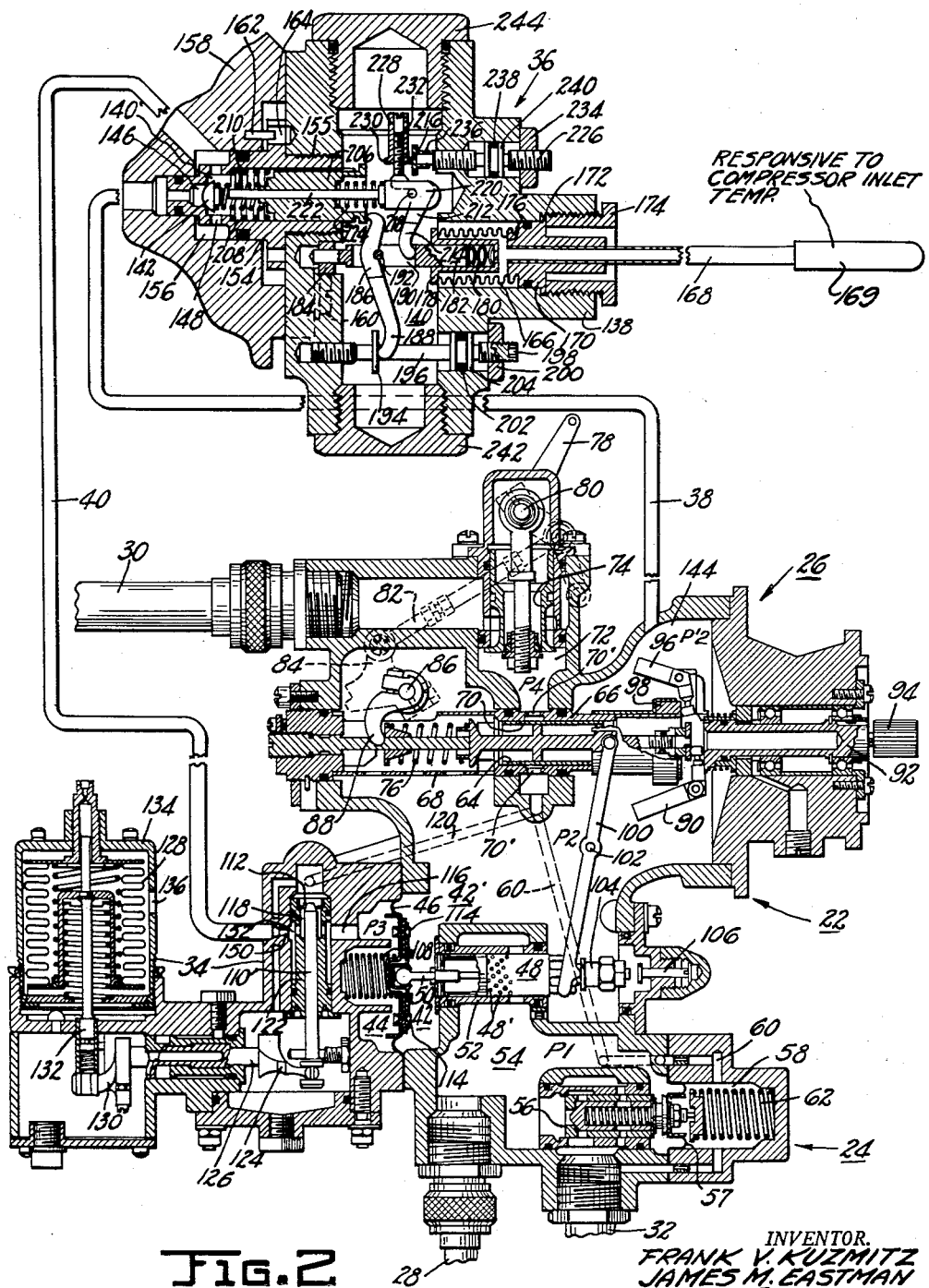
Figure 2 is a sectional schematic view of the device of Figure 1, with the fuel enrichment and temperature compensating control valve unit removed and shown enlarged at the top of the figure to facilitate reading of the drawing.

Referring now to Figure 2 the fuel regulator section 24 is divided into a pair of chambers 42 and 44 by a metering head diaphragm 46. A hollow regulator valve 48, provided with a series of ports 48', is connected to the diaphragm 46 by a stem 50 and is slidingly mounted in a casing 52. Pressurized fuel is delivered to the regulator by pump 18 through conduit 28 and chamber 54. The pump 18 maintains the fuel pressure in chamber 54 (supply or $P_1$ pressure) at a predetermined value as determined by the setting of a by-pass valve 56 which is suitably attached to a diaphragm 57, said diaphragm separating chamber 54 from a chamber 58. When this valve opens, fuel is returned to the low pressure side of the pump 18 as above described. The chamber 58 is preferably vented to metered fuel ($P_4$) pressure by way of passageway 60, a spring 62 being mounted in said chamber and normally urging the valve 56 towards closed position. Thus, the supply pressure in chamber 54 is always maintained at a predetermined value above metered fuel pressure as determined by the force of spring 62.

The control section 26 contains a throttle or governor valve 64, which is slidably mounted in a valve body 66 having a hollow tubular extension 68, the valve being provided with one or more metering or feed restrictions 70, adapted to register with coacting restriction 70' in the valve body. Fuel at $P_2$ pressure in chamber 42' flows through the tubular extension 68 and thence through metering restrictions 70, 70' to metered fuel chamber 72. From the latter chamber, the metered fuel flows across a cut-off valve, generally indicated at 74, and then by way of conduit 30 to the fuel manifold 12 and burner nozzles 16 as described in connection with Figure 1. The governor valve 64 is of the all-speed governor type and is provided with a governor spring 76 which may be selectively set or tensioned by the pilot through suitable linkage including lever 78, shaft 80, adjustable rod or link 82, arm 84, shaft 86 and lever 88. When lever 78 is turned clockwise, the spring 76 is compressed and valve 64 is simultaneously moved in a direction to increase the area of the feed or metering restrictions 70, 70', while the right-hand end of the stem of valve 64 acts to reset a pair of governor weights 90 (only one of which is visible in Figure 2) mounted to rotate with an engine-driven governor shaft 92 which is provided with a drive spline 94 adapted to have a suitable drive connection with the engine. When the selected speed is reached, the governor weights balance the governor spring and an equilibrium condition is attained, whereupon the engine will operate at a substantially constant speed for the particular setting of the pilot's control lever.

The regulator valve 48 is positioned automatically as a function of engine speed and will maintain a fuel head across the governor valve 64 during acceleration for any given condition of compressor inlet pressure and temperature such that predetermined upper and lower turbine temperature and burner die-out limits respectively are not exceeded and such that the compressor cannot surge or stall, irrespective of how suddenly the pilot may vary the area of the metering restriction 70, 70'. As illustrated in Figure 2, the automatic positioning of the regulator valve 48 as a function of engine speed is accomplished by applying the thrust exerted by a pair of centrifugal weights 96 (only one of which is visible in Figure 2) to the regulator valve 48 and its coacting diaphragm 46. These weights 96 are preferably mounted to rotate with the engine driven shaft 92 along with the all-speed governor weights 90. The weights 96, however, act independently of the weights 90. Thus, while the weights 90 act on the inner end of the stem of the governor valve 64, the weights 96 act on a sliding sleeve 98 having a driving connection with the shaft 92, said sleeve in turn having an operating connection with the upper end of a lever 100, the latter being fulcrumed at 102 and at its lower end being forked and contacting a thrust bearing 104 mounted on the stem of the regulator valve 48. As the speed of the engine driven shaft 92 increases, the weights 96 move radially outward and exert a force on the regulator valve 48 in a direction tending to open the latter; this force is opposed, however, by fuel pressure acting on the diaphragm 46 in a direction tending to close said valve, the resultant differential pressure across the diaphragm ($P_2$ minus $P_3$) being proportional to the square of engine speed. This differential is proportional to that imposed across the governor valve 64, and for any given position of the latter valve at any given conditions of compressor inlet pressure and temperature, the velocity and hence the rate of fuel flow across the metering restriction 70, 70' will be proportional to the square root of this differential or to engine speed directly.

An adjustable stop 106 determines the maximum open position of the regulator valve 48, while a spring 108 acting on the diaphragm 46 determines the minimum metering head at engine speeds which may be so low as to produce instability in the regulator system.

Since the supply of air to the engine burners will not only vary with engine speed but also with changes in engine inlet pressure, temperature and aircraft speed (ram pressure), separate engine pressure and engine inlet temperature compensating means are generally shown at 34 and 36 respectively, each of said compensating means being operatively connected to and cooperating with the main fuel control section 22.

First discussing the pressure compensating means and its associated hydraulic circuitry, it has been established that the compressor surge characteristic, the rate of change of fuel flow necessary to maintain any given turbine inlet temperature with changing engine speed, and the fuel flow required to run the engine at any given speed all vary in substantially direct proportion to engine inlet pressure. It is therefore desirable to vary the rate, or change of rate, of fuel flow to the engine burners in direct proportion to any given existing engine inlet pressure. Accordingly, pressure compensating means 34 comprises a contoured needle 110 which controls an orifice 112 in series with one or more fixed control jets 114, communicating chamber 42 with chamber 44 across the regulator diaphragm 46. From chamber 44, fuel may flow to the metered fuel ($P_4$ pressure) chamber 72 by way of passage 116, valve chamber 118, orifice 112 and passage 120. The density needle 110 is mounted to slide in a sealed bearing 122 and at its lower end has an operating connection with an arm or lever 124 secured on the adjacent end of a shaft 126, the opposite end of said shaft having an operating connection with a pressure responsive spring loaded capsule or bellows 128 by means of an arm or lever 130 and rod 132. The bellows or capsule 128 in mounted in a housing 134, vented at 136, the unit as a whole being located where it will be exposed to changes in pressure of the air flowing to the compressor.

For a more complete illustration and description of the device so far described and shown schematically in Figure 2, reference may be had to the patents of Frank C. Mock, above noted, and particularly to the Patent No. 2,689,606, which illustrates the mechanical parts and their relation to each other in greater detail. Functionally the corresponding device illustrated and described in Patent No. 2,689,606 differs in that it is sensitive to changes in temperature as well as pressure.

The combination fuel enrichment device and temperature compensator 36, shown in Figure 2, comprises a body 138, defining a fuel chamber 140, in which is housed the mechanism necessary to provide temperature compensation and fuel enrichment as required. A valve 142 controls the flow of fuel from the governor chamber 144 ($P_2$ pressure) through conduit 38 and a port 146 to the compensating circuit chamber 44 through a plurality of ports 148, conduit 40, a port 150, an annular chamber 152 and passageway 116, and is in turn controlled by mechanism to be described. The ports 148 are formed in a valve housing member 154, which is suitably attached to body 138 as by threaded section 155, and communicates chamber 140' with an annular chamber 156 formed between member 154 and outer valve housing 158, which may be a portion of the housing of the fuel metering section 26, to which body 138 may be suitably attached as by bolts 160. Pin 162 projects from the housing 158 and into one of the annularly arranged apertures 164 in member 154 when the device 36 is assembled, thereby locking the member 154 in a fixed position with respect to housing 158 and body 138.

A thermostat shown in the form of a liquid-filled bellows 166 communicates with a suitable temperature sensing device, such as a temperature bulb 169, in the compressor inlet section of the engine through a conduit 168, said bellows being anchored on a member 170, which is held in fixed position by abutment of the integral flange 172 with a cap member 174 and body 138, at 176. The opposite or movable end of the bellows 166 is sealingly covered by a non-flexible cup-shaped member 178, in which is nested a stack of bi-metallic fuel temperature compensating discs 180, through which movement of the cup-shaped member is transmitted to an actuable shaft 182, which spans the chamber 140, said shaft being held in the cup-shaped member at one end and in a bearing 184, at a reduced section thereof, at the other end. The stack of bi-metallic discs 180 function to compensate for variations in the temperature of the fuel surrounding bellows 166 so that variations in the length of said bellows is a function of the temperature of the liquid within said temperature bulb only. The structure and operation of these discs in combination with the thermostat is described and claimed in Patent No. 2,736,501, filed in the name of George M. Widell, and assigned to the assignee of the present application.

A lever 186, having a predetermined ratio and a bifurcated end 188, passes through a milled-out section 190 of the shaft 182 and is supported by and continuously in contact with a pin 192, which is integral with the shaft 182 and passes through the milled-out section thereof. The lever 186 is fulcrumed at a flange 194, which is integral with an adjustable shaft 196, said shaft being adapted to be adjusted to the right or left as shown in Figure 2, at the external screw head 198, which may be held in any given locked position by a lock nut 200. The fuel in chamber 140 is restrained from leaking by said shaft to the surrounding atmosphere by means of O-ring seal 202, which is positionally held by twin flanges 204, which are integral with shaft 196. The opposite end of said lever 186 is held in continuous engagement with a slideable bearing and spring-retaining member 206 by a spring 208, which abuts a stepped portion of member 154 and continuously urges member 206 rightwardly against lever 186. Opposite ends of a spring 210 about the member 206 at a stepped portion thereof and a flanged portion of the valve 142, respectively, thereby continuously urging the valve 142 toward closed position. If the temperature at the compressor inlet increases, the liquid in the temperature bulb expands into conduit 168, bellows 166 expand thereby actuating shaft 182, lever 186 and member 206 leftwardly and compressing spring 210 to increase the loading on the valve 142 an amount which is proportional to the increase in compressor inlet temperature.

A second lever 212 having a reduced section 214 which passes into the milled out section 190 of shaft 182 and is adapted to continuously contact the solid section of said shaft adjacent thereto, is fulcrumed at 216 and supported by and continuously urged to rotate in a counter clockwise direction, as shown in Figure 2, by a pin 218 which is made integral with a bifurcated end 220 of a shaft 222, which in turn is held in alignment with valve 142 by member 206, said pin being urged rightwardly against lever 212 by a spring 224, which is retained in a cupped portion of member 206 and abuts the enlarged bifurcated end of shaft 222. Dual adjusting means 226 and 228 are operatively connected to the lever 212 such that the adjustment 226 may effectively vary the position of shaft 222 for any given length of bellows 166 and the adjustment 228 may effectively vary the lever ratio of lever 212. The adjusting means 228 comprises an internally threaded screw-headed cap having a round edge multi-sided nut 230 at its opposite end and integral therewith. The adjustment means 228 engages the threaded extension 232 of lever 212, and when adjusted up or down on said threaded extension, effectively varies the fulcrum point of said lever, whereby the quantum of movement transmitted to shaft 222 by lever 212 varies for any given quantum of movement of the bellows 166.

The partially threaded adjustment shaft 226 may be moved to the right or left, as shown in Figure 2, from an external screw head portion thereof and locked in any given position by the lock nut 234. A cup-shaped member 236 is fixedly attached to the non-threaded end of adjustment shaft 226 and is continuously in contact with the round edged nut 230, which may rock on the outer flange portion of member 236. An O-ring seal 238 is positionally held by the dual-flanged members 240 of adjustment shaft 226 and restricts leakage from chamber 140 to the surrounding atmosphere. Adjustment of shaft 226 to the right or left, as shown in Figure 2, for any given position of bellows 166, results in actuation of lever 212 in a clockwise or counterclockwise direction respectively, and of shaft 222 to the right or left respectively.

Sealing means, such as the O-rings indicated at 202 and 238, are used in the unit 36 as necessary to prevent leakage either to the surrounding atmosphere from chamber 140 or 140' or from conduit 38 to conduit 40. A cap member 242, when removed, allows easy access for assembly of the internal mechanism, while cap member 244 additionally allows access to adjustment member 228.

In operation, the flow of fuel through valve 142 varies as a function of the controlled area of port 146 and the pressure differential across said port. The pressure difference $P_2'$ minus $P_2$, which is generated in governor chamber 144, is proportional to the square of the engine speed since the weights 90 and 96 act as the impeller of a centrifugal pump, while the pressure in chamber 140' and conduit 40 is substantially equal to $P_3$ pressure in chamber 44. Since the pressure difference $P_2$ minus $P_3$ is also held proportional to the square of engine speed, the pressure differential $P_2'$ minus $P_3$ across valve 142 varies substantially as the square of the engine speed. The valve 142 controls the area of port 146 as a function of the loading of spring 210 and can open an amount which varies with the position of the shaft 222. For any given position of the adjustment members 196, 228 and 226, for any given ratios of the levers 186 and 212, and for any given rate of the spring 210, a given temperature at the compressor inlet will result in a predeterminable length of the bellows 166 and therefore a predeterminable spring load of the spring 210 and position of the shaft 222 as the levers 186 and 212 actuate the member 206 and the shaft 222 respectively to predetermined positions as a function of compressor inlet temperature. If the engine speed is increasing, as during acceleration, the increasing fuel pressure upstream of valve 142 will cause said valve to open at an engine speed determined by the spring loading of spring 210, said valve opening at a rate which is a function of the rate of spring 210 to a maximum open position as determined by the position of shaft 222. If the temperature of the air at the compressor inlet increases for any reason, the liquid in bulb 169, conduit 168 and bellows 166 will expand, resulting in an elongation of bellows 166 which is proportional to the increase in temperature. This extension of the bellows actuates the shaft 182 leftwardly and levers 186 and 212 about their respective fulcrums, thereby resulting in an increased loading of the spring 210 and a movement of the shaft 222 leftwardly. During an acceleration of the engine at this assumed higher temperature, the valve 142 will begin to open at an engine speed which is proportionally higher than the speed at which said valve opened prior to the increase in compressor inlet temperature due to the increased loading of spring 210, and the maximum area to which it can open will be proportionately less than the area to which it could open prior to the increase in said temperature due to the movement of the shaft 222 to the left. Conversely if there be a decrease in compressor inlet temperature, the bellows will contract, resulting in a decreased loading of spring 210 and therefore a proportionately decreased engine speed at which valve 142 will begin to open and an actuation of shaft 222 to the right whereby the valve 142 can open to a proportionately larger area. The springs 208 and 224 simply function to insure the continuous contact of lever 186 with member 206, pin 192 and flange 194 and of the lever 212 with member 236, pin 218 and shaft 182 respectively, irrespective of the degree of elongation of the bellows 166, or the position of adjustment members 196, 228 or 226.

Operation of Figures 1 and 2

Usually an electric starting motor is used to crank a gas turbine engine while at the same time fuel is fed to the burners and ignited, cranking being continued until the engine attains a self-sustaining speed. In tracing the flow of fuel through the control as schematically illustrated in Figure 2, it may be assumed that the engine is operating at idle speed at ground level, in which event the regulator valve 48 would be partly open under the influence of the idle spring 108 and the centrifugal regulator valve weights 96. Fuel flows to the entrance chamber 54 by way of conduit 28 at a $P_1$ pressure determined by the setting of the by-pass valve 56, then across the regulator valve 48 to chambers 42, 42' ($P_2$ pressure) and thence across the metering restriction 70 to metered fuel chamber 72 ($P_4$ pressure), from which it flows by way of conduit 30, to the fuel manifold 12 and thence to the burner nozzles as heretofore explained. A limited quantity of fuel will also flow through the control jets 114 and thence through the compressor inlet pressure control circuit to the metered fuel chamber 72 in the manner heretofore described, this flow by-passing the governor valve 64. When the engine is operating in a speed range and at a compressor inlet temperature at which the enrichment valve and temperature compensating unit 36 is operative, a further limited quantity of fuel will flow from the governor chamber 144 ($P_2'$ pressure) to chamber 44 through valve 142 in the manner heretofore described, and thence to metered fuel chamber 72 by way of orifice 112 and conduit 120. This temperature compensating circuit is in parallel with the control jets 114 and in series with the orifice 112, thereby increasing the bleed flow through orifice 112 whenever it is operative to flow fuel.

The governor or throttle valve 64 is the prime control of fuel to the engine; it is positioned by the pilot's throttle or control lever, who selects the desired engine speed. For every throttle lever position, there is a definite force set up by the governor spring 76 tending to open the governor valve 64, and for every engine speed, there is a definite thrust force set up by the governor weights 90 tending to close said valve. When the pilot sets his throttle, the valve 64 will automatically seek a position of equilibrium, at which time the thrust force from the governor weights 90 equals the force of the spring 76 and fuel is metered at a rate tending to maintain the engine speed constant.

The fuel pressure differential across the regulator diaphragm 46 is equal to and balances the force set up by the centrifugal head generating weights 96, and is proportional too the square of the engine speed. If at a given engine speed the governor valve 64 is repositioned, the regulator valve 48 will also be repositioned due to the fact that the regulator differential will be out of balance with the differential across the governor valve. As the governor valve 64 opens or closes to maintain the speed selected by the setting of the governor, the regulator valve 48 opens or closes to maintain the fuel head or pressure differential across the valve 64 in accordance with the particular speed at which the engine is operating. The pressure compensating device 34 operates to control the action of the regulator valve 48 as follows:

Assuming, for purposes of illustration, that the engine is operating at some given speed below that at which the temperature compensating valve 142 is set to open and at some given compressor inlet pressure and temperature, then the contoured pressure needle 110 will control the orifice 112 in accordance with the existing compressor inlet pressure so that the $P_2$ minus $P_4$ pressure drop across the governor valve is proportional to the square of engine speed and to compressor inlet pressure directly. In other words, air at the assumed pressure surrounds the bellows 128, which results in a predetermined length of said bellows and therefore a predetermined position of the contoured needle 110, and a predetermined area of the orifice 112, and since the $P_2$ minus $P_3$ pressure differential is held constant by a balancing of the pressure force on diaphragm 46 with the centrifugal force imposed by the head generating weights 96 on the regulating valve 48, the regulating valve 48 will have assumed a position such that the $P_2$ minus $P_4$ pressure differential is proportional not only to the square of engine speed but also to the compressor inlet pressure. If a decrease in compressor inlet pressure occurs, as with an increase in altitude, the engine will require a decrease in fuel flow which is proportional to the decrease in compressor inlet pressure at that engine speed. As a result of the decrease in air pressure, the bellows 128 will elongate until its internal spring force is again balanced by the pressure of the air surrounding the bellows, thereby actuating rod 132 downwardly and rotating lever 130, shaft 126 and lever 124 to move the needle 110 in a direction to increase the opening of orifice 112, thereby decreasing pressure $P_3$ and the differential pressure $P_3$ minus $P_4$ and momentarily increasing the pressure differential $P_2$ minus $P_3$. This momentary increase in the differential across the diaphragm 46 causes the regulator valve 48 to become unbalanced and move toward a closed position, thereby decreasing $P_2$ pressure until the differential across the diaphragm 46 is again equal to the constant force oppositely acting on the regulator valve at the set engine speed and equilibrium is again established. Conversely, an increase in entering air pressure results in compression of bellows 128 and an actuation of needle 110 in a direction to decrease the area of orifice 112, whereby the pressure $P_3$ increases and the regulator valve 48 moves to the right or open position under the influence of the centrifugal head generating weight force until pressure $P_2$ increases to reestablish the $P_2$ minus $P_3$ differential to balance the force of the weights 96 at the given speed. It is therefore apparent that the regulator valve 48 varies its position for any given engine speed so as to maintain the fuel flow to the engine burners proportional to compressor inlet pressure. The required variation in fuel flow to the engine with any given variation in compressor inlet pressure is directly proportional to variations in compressor inlet pressure whether referenced to the steady state requirement of the engine at any given speed, the fuel flow acceleration schedule of the engine as it relates to maximum turbine inlet temperature or to compressor surge and the deceleration fuel flow schedule of the engine.

Referring now to Figure 4, two acceleration schedules are shown, as are the corresponding steady state requirement curves, at sea level and altitude, each being at the same assumed constant compressor inlet temperature. If the engine is operating at point *a* on the sea level requirement curve *a–f* and the pilot resets the governor to point *f*, the engine will accelerate along the curve *a–b–c–d–e–f*. When the governor is reset to govern at a higher speed, the spring 76 is reset and the governor valve 64 opens to its maximum area and remains at that area until such time as the governor weights 90 overcome the reset governor spring and govern to selected speed. Immediately following the resetting of the governor, the fuel flow increases from point *a* to point *b* and this excess of fuel flow to the engine causes acceleration to begin and proceeds along curve segment *b–c*.

At point *c* a sufficient $R_2'$ pressure has been generated in the governor chamber 144 to overcome the loading of the spring 210 at the assumed compressor inlet temperature and the valve 142 begins to open. The rate of which the valve 142 opens is a function of the rate of the spring 210 which in turn determines the slope of curve segment *c–d*. The opening of the valve 142 results in an increase of bleed flow to chamber 44 which in turn results in an increase in $P_3$ pressure and the $P_3$ minus $P_4$ differential and an opening of the regulator valve 48 to increase $P_2$ pressure so that the $P_2$ minus $P_3$ pressure follows the increasing oppositely acting forces on the regulator valve as the engine accelerates. The valve 142 continues to open as the engine speed increases until it comes in contact with the end of shaft 222, which in conjunction with the pressure needle 110 and the regulator valve determines the metering head ($P_2$ minus $P_4$) necessary to establish and maintain substantially maximum allowable turbine inlet temperature along the curve segment *d–e*. As the selected speed is approached the governor weights 90 begin to overcome the force of spring 76 and the governor valve 64 begins to close at point *e* cutting off fuel flow along the governor break curve *e–f*, selected speed being reached at point *f* on the steady state requirement curve as the regulator valve 48 finds its equilibrium position at the engine speed and fuel flow indicated by point *f*.

If the engine is accelerated at altitude at the same compressor inlet temperature an acceleration schedule such as that indicated by the curve *a'–b'–c'–d'–e'–f'* results. Since the compressor inlet temperature has not changed, the action of the valve 142 will be the same as for a sea level acceleration and enrichment will begin at point *c'* and end at point *d'* each being at an engine speed which is the same as that at points *c* and *d*, respectively. The change in slope of the acceleration curve segments *b'–c'*, *c'–d'* and *d'–e'*, as compared with their respective counter-parts on the sea level acceleration curve, is a function of the $P_3$ minus $P_4$ differential as controlled by the contour of the needle 110 as it controls the area of orifice 112 and therefore the degree of opening of the regulator valve and the metering head ($P_2$ minus $P_4$) at any given engine speed along the acceleration schedule.

Referring now to Figure 5, wherein $$\frac{W_f}{\delta}$$

has been plotted against N, near optimum acceleration schedules at three compressor inlet temperatures and their corresponding engine require to run curves are shown. As explained hereinbefore, a plot of fuel flow divided by the dimensionless ratio delta versus engine speed $$\left(\frac{W_f}{\delta} \text{ v. } N\right)$$

at any given compressor inlet temperature results in a single compressor surge curve, a single engine acceleration schedule and a single engine requirement curve, regardless of variations in engine inlet pressure. In other words, if the curves in Figure 4 were plotted against $$\frac{W_f}{\delta}$$

instead of $W_f$ alone, the altitude curve would be superposed on the sea level curve if the latter be assumed to be at standard conditions of pressure and temperature. In the curves of Figure 5, therefore, the variations in acceleration schedules and in required to run fuel flows is due solely to the variations in compressor inlet temperatures as indicated. As hereinbefore explained, the compressor surge curves move downward and to the left toward the origin with decreasing compressor inlet temperature and a straight line curve segment *o–b–c–c'* may be drawn substantially tangent to the surge curve as it shifts with changing temperature. Since this curve segment is below the indicated maximum allowable turbine inlet temperature curves, as shown, it is unnecessary to compensate for compressor inlet temperature variations through this range of operation and therefore the curve segment *a–b–c–c'* is drawn as a single line regardless of variations in conditions at the compressor inlet. There is therefore no temperature compensation until an engine speed is reached at which fuel enrichment begins, which speed is determined by the location of the compressor surge curve at any particular compressor inlet temperature, and beyond which fuel pressure and temperature compensation is supplied. For example, the acceleration schedule *a–b–c–d–e–f* indicates a near optimum allowable acceleration rate from point *a* to point *f* on a minus 60° F. day at any given compressor inlet pressure while the schedule *a'–b–c'–d'–e'–f'* indicates a similarly optimum acceleration schedule from point *a'* to point *f'* on a 140° F. day at any given compressor inlet pressure.

The fuel control shown in Figure 2 meets these optimum schedules as follows:

If the engine is accelerated from point *a* to point *f* at any given altitude an initial burst of accelerating fuel flow *a–b* flows to the burners as the governor valve 64 flies open under the influence of the now greatly compressed spring 76. Meanwhile the bellows 166 has sensed the minus 60° F. compressor inlet temperature and is in a relatively contracted position resulting in a relatively low load on the spring 210 and a near maximum movement of the shaft 222 away from the seated valve 142. The bimetallic discs 180 have, in the meantime, acted to actuate the shaft 182 in a direction to compensate for the low temperature fuel within the bellows 166 resulting in a position of the shaft 182 which is an accurate function of compressor inlet temperature. Due to the low spring load acting on the valve 142, the fuel pressure $P'_2$ generated in chamber 144 acts on valve 142 to open said valve at a relatively low engine speed as indicated at point *c*, from which point acceleration proceeds along curve segment *c–d* as the valve 142 opens to its maximum area as hereinbefore explained. Curve segment *c–d* just skirts the outlying portion of the compressor surge curve, the fuel flow then proceeding along curve segment *d–e*, the governor valve 64 beginning to close at point *e* and governing to point *f* on the engine required-to-run curve. As the compressor inlet temperature increases from minus 60° F. to, say, 140° F. the required-to-run curve drops while the compressor surge curve shifts upwardly along *o–b–c'* and the maximum allowable turbine inlet temperature curve drops, as indicated, thereby necessitating a re-scheduling of the accelerating fuel flow as defined by the curve *a'–b–c'–d'–e'–f'*.

In thus scheduling the accelerating fuel flow, an optimum rate of acceleration is obtainable in the lower speed range for any compressor inlet temperature as indicated by the degree of increase of fuel flow from *a'* to *b* and the increase from point *a* to *b*. As the compressor inlet temperature has increased from minus 60° to 140° F. the bellows 166 has expanded a relatively large amount to actuate the shaft 182 and the levers operatively connected thereto such that the loading on spring 210 has increased as a function of the increased temperature so that the valve 142 will not begin to open until speed $c'$ has been reached while the shaft 222 has been actuated toward the valve 142 a distance which limits the opening of said valve to allow an increased fuel flow to point $d'$, said point being substantially coincident with the curve of maximum allowable turbine inlet temperature at that speed. Acceleration again proceeds at substantially maximum allowable turbine inlet temperature along curve segment $d'-e'$ at which latter point the governor valve begins to close and governs the engine to point $f'$ on the required-to-run curve at 140° F.

The characteristics of the compressor surge curve and the maximum turbine inlet temperature curve will vary with different engines, and the functions of the adjusting means 196, 226 and 228 facilitate calibration of the unit 36 to meet the engine fuel flow requirements as varied by variations in compressor inlet temperature conditions for any engine.

Assuming a right hand screw thread in each case, rotation of adjustment 196 in a clockwise direction results in a decrease in the loading on spring 210 for any given position of thermostat 166 and therefore decreases the speed (points $c$ and $c'$ of Figures 4 and 5) at which temperature compensated fuel enrichment begins, whereas rotation of adjustment 196 in a counterclockwise direction has the opposite effect. Rotation of adjustment 226 in a clockwise direction results in a movement of shaft 222 toward valve 142 for any given position of thermostat 166 and has the effect of moving the points $d$ and $d'$ of Figures 4 and 5 downwardly along the acceleration enrichment curve segments $c-d$ and $c'-d'$ respectively, an amount proportionate to the degree of adjustment of element 226, whereas rotation of said adjustment counterclockwise has the opposite effect. Rotation of adjustment 228 in a clockwise direction has the effect of moving the fulcrum 216 toward the pin 218, whereby the quantum of movement imparted to the shaft 222 for any given movement of bellows 166 is decreased, resulting in a decrease in vertical spread or fuel flow variation between the maximum turbine inlet temperature curve segments $d-e$ and $d'-e'$ of Figure 5, whereas rotation of adjustment 228 in a counterclockwise direction moves the fulcrum 216 away from the pin 218 and has the opposite effect of increasing the spread of the maximum turbine temperature curve segments. It becomes apparent therefore that the great flexibility of available adjustment of the applicants' invention enables it to be adapted to meet the requirements of a great variety of gas turbine engine configurations.

A characteristic deceleration schedule is shown on Figure 5 at a compressor inlet temperature of 140° F. by the curve $f'-g'-h'-i'-j'-a'$. If the pilot wishes to select the power condition existing at $a'$ while operating at $f'$ he moves his pilot's lever to a position which selects the power condition $a'$, resulting in a clockwise rotation of the lever 88 in Figure 2 and a corresponding elongation of spring 76 whereby the governor weights 90 overcome the decreased spring load and the governor valve 64 moves immediately to its minimum area position, resulting in an immediate decrease in fuel flow from the point $f'$ to the point $g'$ in Figure 5. Simultaneously with the closing of the governor valve the pressure $P_2$ increases sharply, resulting in a movement of the regulator valve 48 toward closed position to reestablish the $P_2$ minus $P_4$ head across the now decreased governor valve area, while the by-pass valve 56 increases its opening to maintain a constant $P_1$ minus $P_4$ pressure as the fuel flow to the engine decreases. At point $g'$ considerably less fuel than that required to run the engine at the existing conditions is being supplied and the engine begins to decelerate along the curve segment $g'-h'$. As the engine decelerates the regulator valve continues to move toward closed position since the force output of the centrifugal head generating weights 96 is continually decreasing. As the engine decelerates, $P_2'$ pressure also decreases until at $h'$ (which is the same as the speed at $d'$) the valve 142 moves away from the stop 222. As speed further decreases valve 142 continues to close until it seats at the speed $i'$ which is the same as the speed $c'$. As the area of the valve 142 decreases during deceleration, the pressure $P_3$ decreases as a function of the rate of closing of the valve 142 and engine speed, resulting in a relatively steep sloped deceleration between the point $h'$ and the point $i'$, following which the valve 142 is completely closed; the bleed flow into chamber 44 is now solely a function of the area of the fixed jets 114 and the $P_2$ minus $P_3$ head thereacross which follows engine speed, resulting in the relatively flat sloped deceleration curve $i'-j'$. At the point $j'$ the engine speed has decreased to such an extent that the force of spring 76 begins to open the valve 164 in opposition to the governor weight force 90 and the fuel flow increases to point $a'$ as the engine continues to decelerate along $j'-a'$, equilibrium being reached at point $a'$ on the required-to-run curve.

As the compressor inlet temperature decreases from 140° F. the deceleration schedule will vary in accordance with the action of the unit 36 so as to avoid burner dieout and rapidly decelerate to the selected engine speed.

*Figure 3*

In Figure 3 is shown a modification of the fuel enrichment and temperature compensating device shown at 36 in Figure 2, in which parts corresponding to those shown in Figure 2 are similarly numbered. This embodiment of the fuel enrichment and temperature compensating device comprises a valve 254, slidable in a ported sleeve and housing member 256 which is rigidly attached to the outer valve housing 158' as by bolts 160'. The housing 158' shown in Figure 3 is preferably a part of the housing of the fuel metering section 26 adjacent chamber 144. Ports 258 communicate the conduit 38', containing fuel at $P_2'$ pressure with the conduit 40', containing fuel at $P_3$ pressure, through an annular chamber 262 when the valve 254 is in an open position, and ports 264 communicate the chamber 266, which surrounds bellows 166' and extends into the hollowed valve 254, with fuel at $P_3$ pressure in chamber 262. The periphery of the hollowed valve 254 contains ports 268 which are at all times coincident with the ports 264, so that said latter ports are at all times unrestricted. The bellows 166' is anchored at one end on member 270, which may be screwed into the outer threaded section of member 256 and locked into position by lock nut 272, and through which passes the conduit 168', which communicates the liquid-filled bellows with a temperature bulb 169', sensitive to compressor inlet temperature. The cup-shaped member 178', which is an integral part of the thermostat assembly, houses the fuel temperature compensating bimetallic discs 180' and one end of a reciprocable shaft 274. A flange 274', adjacent a reduced section of said shaft, acts as a retainer for a spring 276 which is concentric with and surrounds the reduced section of said shaft and abuts the closed end of the valve 254 at its opposite end. A seal-ing means, which prohibits the flow of fuel from conduit 38' to conduit 40' around the outer periphery of member 256, is shown at 278, while similar means are shown at 280 and 282 and prohibit the leakage of fuel from chamber 262 and the chamber 266 respectively to the surrounding atmosphere.

In operation, the device shown in Figure 3 acts in combination with the fuel control unit 22 of Figure 2 to establish acceleration fuel flow schedules as shown in Figures 4 and 6, and governing characteristics and deceleration fuel flow schedules substantially as described with reference to Figure 5. Since the bellows 166' varies its length directly as a function of compressor inlet temperature, it assumes a predetermined position for any given temperature, thereby preloading the spring 276 a predetermined amount and actuating the shaft 274 toward the closed end of valve 254 with an increase in temperature and permitting the spring 276 to actuate shaft 274 away from the closed end of valve 254 with a decrease in temperature.

Assuming, with reference to Figure 6 wherein acceleration schedules for three compressor inlet temperatures at any given compressor inlet pressure are shown, that an engine of the type specified is accelerated at minus 60° F. compressor inlet temperature, the engine would accelerate along the schedule b–c–d–e–f. Under such conditions the bellows 166' is in a relatively contracted position, resulting in a low pre-load on spring 276, and the shaft 274 is relatively retracted, thereby enabling the engine to accelerate at a near optimum rate, as explained with reference to Figures 2 and 5. If the compressor inlet pressure increases to 140° F., the thermostat expands, thereby preloading the spring 276 a relatively large amount and actuating shaft 274 leftwardly to the near closed position of valve 254, whereby the minus 60° F. acceleration schedule shifts to the 140° F. schedule b–c'–d'–e'–f' in accordance with the accelerating fuel flow limitations imposed by the shift in the compressor surge curve and the maximum allowable turbine inlet temperature curve. It should be noted, with reference to Figure 6, that the fuel enrichment portion of the acceleration schedule ends at the same speed regardless of variations in compressor inlet temperature. This characteristic, which may be preferable with certain engine configurations, results from the fact that the maximum loading on spring 276, which occurs whenever the valve 254 is in its wide open position, is a constant value irrespective of changes in compressor inlet temperature. For example, if compressor inlet temperature increases and the bellows 166' expands, equal increments of movement are imparted to both the shaft 274 and the spring 276, which increment of spring preloading is effectively subtracted after the valve has opened to contact the end of shaft 274, since the increment of shaft movement with increased temperature is equal to the increment of spring movement. Since the pressure $P_2$ varies with engine speed and opens the valve 254 at a rate dependent on the spring rate of spring 276, a constant maximum resultant spring force at maximum valve opening for any given compressor inlet temperature is indicative of a constant engine speed.

Although only two embodiments of our invention have been illustrated and described, other modifications and changes of structure and relative arrangement of parts will be apparent to those skilled in the art.

We claim:

1. In a fuel feed system for a gas turbine engine having a burner, a fuel control device comprising a main fuel conduit connected to said burner, a fuel feed restriction in said conduit, a fuel chamber in said conduit upstream of said restriction, throttle valve means adapted to control the area of said restriction, engine governing means for controlling said throttle valve means including means for generating a fluid pressure in said chamber which increases with increases in engine speed, an air pressure compensating device operatively associated with said throttle valve means in such a manner that the fuel flows through said throttle valve means varies as a function of ambient air pressure at all engine operating conditions, and a fuel enrichment device connected to said fuel chamber and operatively connected to said compensating device for enriching fuel flow to the engine comprising flow valve means responsive to increases in said fluid pressure, resilient means urging said flow valve means towards a closed position and a device openable responsive to temperature of the air anterior to the burner operatively connected to said flow valve means and said resilient means in such a manner that said flow valve means is controlled to open and enrich the fuel flow to the engine at higher engine speeds with increases in said temperature.

2. In a system for feeding fuel to the burners of a gas turbine engine, a conduit for supplying metered fuel to the burner, a metering restriction in the conduit, a fuel passage in parallel with said metering restriction, a port in said passage, means movable to vary the effective area of said port as a function of engine speed, means resisting movement of said last named means in an area increasing direction and a device for sensing an engine operating condition operatively connected to said area varying means for varying the maximum opening of said port as a function of said engine operating condition and for varying the resistance of said resisting means to initial opening of said port as a function of said engine operating condition.

3. In a temperature compensated enriching device for a gas turbine engine having a burner, a fuel conduit for conducting fuel to the burner under certain conditions of engine operation, a flow restriction in said conduit, engine speed responsive fuel enrichment valve means adapted to vary said restriction during an acceleration of the engine, and means responsive to an air temperature anterior to the burner operatively connected to said enrichment valve means and movable as a function of increasing temperature, said operative connection including resilient means and a valve stop member, said resilient means being operable to increasingly urge said enrichment valve towards a closed position with an increase in said temperature such that the engine speed at which fuel enrichment begins varies directly as a function of said temperature, and said stop member being operable to increasingly restrict the maximum open position of said enrichment valve with an increase in said temperature such that the fuel flow at which fuel enrichment ends varies inversely as a function of said temperature.

4. In a fuel feed system for a gas turbine engine having an air compressor and a burner to which air and liquid fuel are supplied under pressure, a fuel control device comprising a main fuel conduit, first and second fuel feed restrictions in said conduit, a regulating valve adapted to control the area of said first restriction, a throttle valve adapted to control the area of said second restriction, engine speed sensing means for controlling said throttle valve, pilot control means operatively connected to said throttle valve for selecting any desired engine speed, means defining a fuel chamber in which said speed sensing means acts to increase the fuel pressure therein as a function of engine speed, an air pressure compensating circuit for controlling the position of said regulating valve including a passage by-passing the throttle valve and having a fixed restriction and a variable restriction in series therein, air pressure responsive means for varying the area of said variable restriction, and a fuel enrichment and temperature compensating device comprising a fuel passageway communicating said fuel chamber with said variable restriction, valve means in said passageway responsive to said fuel pressure for controlling the flow of fuel therethrough, a compressor inlet temperature sensing device connected to said valve means, said connection including a spring arranged to urge said valve means toward a closed position, a variable valve stop means, and first and second lever means, said first lever means being operable to variably preload said spring means in such manner that said valve means begins to open and enrich the fuel flow to the engine at higher engine speeds with higher values of compressor inlet temperature, and said second lever means being operable to actuate said variable valve stop means in such manner that fuel enrichment terminates at a different engine speed for each value of compressor inlet temperature.

5. In a fuel feed system for a gas turbine engine having an air compressor and a burner to which air and liquid fuel are supplied under pressure, a fuel control device comprising a main fuel conduit, first and second fuel feed restrictions in said conduit, valve means adapted to control the area of said first restriction, a throttle valve adapted to control the area of said second restriction, all-speed engine governing means for controlling said throttle valve, pilot control means operatively connected to said governing means for selecting any desired engine speed, a fuel chamber in which said governing means acts to increase the fuel pressure therein with increases in engine speed, an air pressure compensating circuit for controlling the position of said valve means including a passage by-passing the throttle valve and a device responsive to air pressure for varying the flow in said passage, and a fuel enrichment device connected to said fuel chamber and operatively connected to said compensating device comprising flow valve means which is urged in an opening direction in response to increases in the pressure in said fuel chamber, resilient means urging said flow valve means toward a closed position, and a device responsive to changes in ambient air temperature operatively connected to said flow valve means and said resilient means for causing said flow valve means to open and enrich fuel flow to the engine at higher predetermined engine speeds for each increased value of ambient temperature.

6. In a fuel feed system for a gas turbine engine having an air compressor and a burner to which air and liquid fuel are supplied under pressure, a fuel control device comprising a main fuel conduit, first and second fuel feed restrictions in said conduit, valve means adapted to control the area of said first restriction, a throttle valve adapted to control the area of said second restriction, all-speed engine governing means for controlling said throttle valve, pilot control means operatively connected to said governing means for selecting any desired engine speed, a fuel chamber in which said speed governing means acts to produce a fuel pressure increasing with increases in engine speed, an air pressure compensating device for controlling the position of said valve means including a passage for by-passing the throttle valve and a device responsive to air pressure for varying the flow in said passage, and a fuel enrichment device connected to said fuel chamber and operatively connected to said compensating device comprising flow valve means which is urged in an opening direction upon an increase in pressure in said fuel chamber, and a device responsive to temperature of the air anterior of the burner operatively connected to said flow valve means, said operative connection including means actuatable by said temperature responsive device such that said flow valve means is urged in a closing direction with a force increasing with increases in the temperature sensed.

7. In a fuel feed system for a gas turbine engine having a burner, a fuel control device comprising a main fuel conduit, a fuel feed restriction in said conduit, a fuel chamber upstream of said restriction, means for generating a force in said chamber which increases with increases in engine speed, an air pressure compensating device including a passage in parallel with said restriction and ambient air pressure responsive means for varying the flow through said passage, a temperature compensated fuel valve means responsive to said force and means responsive to temperature of the air anterior to the burner operatively connected to said fuel valve means in such a manner that said valve means connects said chamber with said passage at an increased engine speed for each increased value of said temperature.

8. In a fuel feed system for a gas turbine engine having a burner, a fuel control device comprising a main fuel conduit, a fuel feed restriction in said conduit, throttle valve means adapted to control the area of said restriction, a fuel chamber anterior to said valve means, means for generating a force in said chamber which increases with increases in engine speed, an air pressure compensating device including a flow passage and a chamber in parallel with said restriction and ambient air pressure responsive means for varying the flow through said passage, fuel passage means connecting said chambers, a temperature compensated valve for controlling flow through said passage, means responsive to the temperature of the air anterior of said burner operatively connected to said valve, and movable means controlled by said temperature responsive means in such a manner that flow through said valve is cut off at a reduced fuel flow level for each increased value of said temperature.

9. In a system for feeding fuel to the burner of a gas turbine engine, a conduit for supplying metered fuel to the burner, a metering restriction in the conduit, means for regulating the pressure drop across said restriction, a fuel chamber upstream of said restriction, means for producing a fuel pressure in said chamber which increases with increases in engine speed, fuel flow control means including a passage connecting said chamber with said pressure drop regulating means, means in said flow control means responsive to the pressure of the air anterior of the burner for varying the flow of fuel to the burner, a port in said passage, valve means adapted to vary the opening of said port as a function of the fuel pressure in said fuel chamber, means resisting opening movement of said valve means, and means sensing an engine operating condition operatively connected to said valve means for varying the resistance to opening of said valve means.

10. In a system for feeding fuel to the burner of a gas turbine engine, a conduit for supplying metered fuel to the burner, a metering restriction in said conduit, fuel flow control means including a passage in parallel with said metering restriction, valve means in said passage responsive to the pressure of the air anterior of the burners for varying the flow through said restriction, an enrichment valve in said control means adapted to vary the fuel flow through said restriction by initiating fuel enrichment at some predetermined engine speed, and a device responsive to the temperature of the air anterior of the burners operatively connected to said enrichment valve means in such a manner that the fuel enriching effect of said enrichment valve is varied as a function of said temperature.

11. In a fuel feed system for a gas turbine engine having a burner fuel passage means adapted to conduit fuel to the burner, a flow restriction in said passage means, engine speed responsive fuel enrichment valve means normally closing said restriction during operation below predetermined engine speeds and adapted to open said restriction above said predetermined engine speeds for enriching the fuel flow to the burner, and means responsive to a temperature anterior of the burner and operatively connected to said speed responsive valve means for increasing the engine speed at which said valve means begins to open said restriction with increases in said temperature, said operative connection including resilient means for variably urging said valve means towards closed position as a function of said temperature.

12. In a fuel feed system for a gas turbine engine having a burner, fuel passage means adapted to conduct fuel to the burner, a flow restriction in said passage means, engine speed responsive fuel enrichment valve means normally closing said restriction during operation below predetermined engine speeds and adapted to open said restriction above said predetermined engine speeds for enriching the fuel flow to the burner, and means responsive to a temperature anterior of the burner and operatively connected to said speed responsive valve means for increasing the engine speed at which said valve means begins to open said restriction with increases in said temperature, said operative connection including means for varying the maximum degree of opening of said restriction by said valve means as a function of said temperature.

13. In a fuel feed system for a gas turbine engine having a burner, fuel passage means adapted to conduct fuel to the burner, a flow restriction in said passage means, fuel enrichment valve means responsive to a generated fuel pressure which varies as a function of engine speed normally closing said restriction during operation below predetermined engine speeds and adapted to open said restriction above said predetermined engine speeds for enriching the fuel flow to the burner, and compressor inlet temperature responsive means operatively connected to said speed responsive valve means for increasingly urging said valve means toward closed position with increases in said temperature such that the engine speed at which said valve means begins to open said restriction increases with increasing temperature.

References Cited in the file of this patent

UNITED STATES PATENTS

| | | |
|---|---|---|
| 2,404,428 | Bradbury | July 23, 1946 |
| 2,414,322 | Mock | Jan. 14, 1947 |
| 2,503,048 | Ifield | Apr. 4, 1950 |
| 2,536,158 | Chamberlin et al. | Jan. 2, 1951 |
| 2,538,582 | Mordell et al. | Jan. 16, 1951 |
| 2,545,698 | Holley et al. | Mar. 20, 1951 |
| 2,557,526 | Bobier et al. | June 19, 1951 |
| 2,564,127 | Orr | Aug. 14, 1951 |
| 2,633,830 | McCourty et al. | Apr. 7, 1953 |
| 2,636,553 | Ballantyne et al. | Apr. 28, 1953 |
| 2,689,606 | Mock | Sept. 21, 1954 |
| 2,698,654 | Jorgensen | Jan. 4, 1955 |
| 2,705,047 | Williams et al. | Mar. 29, 1955 |

FOREIGN PATENTS

| | | |
|---|---|---|
| 958,905 | France | Sept. 21, 1949 |
| 664,807 | Great Britain | Jan. 9, 1952 |

UNITED STATES PATENT OFFICE
CERTIFICATE OF CORRECTION

Patent No. 2,971,574                 February 14, 1961

Frank V. Kuzmitz et al.

It is hereby certified that error appears in the above numbered patent requiring correction and that the said Letters Patent should read as corrected below.

Column 3, line 22, for "compresor" read -- compressor --; line 28, for "condtions" read -- conditions --; column 6, line 71, for "$P_2$" read -- $P_2'$ --; column 10, line 1, for "too" read -- to --; lines 35 and 36, for "requite" read -- require --; same column 10, line 56, for "in creases" read -- increases --; column 11, line 14, for "$R_2'$" read -- $P_2'$ --; line 17, for "of" read -- at --; column 15, line 44, for "$P_2$" read -- $P'2$ --.

Signed and sealed this 3rd day of October 1961.

(SEAL)
Attest:

ERNEST W. SWIDER                                          DAVID L. LADD
Attesting Officer                                           Commissioner of Patents